US008051576B2

(12) United States Patent
McDonnell et al.

(10) Patent No.: US 8,051,576 B2
(45) Date of Patent: Nov. 8, 2011

(54) METROLOGICAL APPARATUS FOR MEASURING SURFACE CHARACTERISTICS

(75) Inventors: Ivor McDonnell, Leicestershire (GB); Jeremy Ayres, Leicestershire (GB)

(73) Assignee: Taylor Hobson Limited, Leicestershire (GB)

( * ) Notice: Subject to any disclaimer, the term of this patent is extended or adjusted under 35 U.S.C. 154(b) by 219 days.

(21) Appl. No.: 12/299,992

(22) PCT Filed: May 1, 2007

(86) PCT No.: PCT/GB2007/001585
§ 371 (c)(1),
(2), (4) Date: Apr. 13, 2009

(87) PCT Pub. No.: WO2007/129037
PCT Pub. Date: Nov. 15, 2007

(65) Prior Publication Data
US 2009/0300929 A1 Dec. 10, 2009

(30) Foreign Application Priority Data
May 8, 2006 (GB) .................................. 0609076.5

(51) Int. Cl.
*G01B 5/004* (2006.01)
*G01B 7/28* (2006.01)
(52) U.S. Cl. ............................... 33/559; 33/503; 33/556
(58) Field of Classification Search .................. 33/503, 33/504, 551, 553–556, 558, 559, 561
See application file for complete search history.

(56) References Cited

U.S. PATENT DOCUMENTS

| 3,452,273 | A |   | 6/1969  | Foster              |
|-----------|---|---|---------|---------------------|
| 3,478,436 | A | * | 11/1969 | Barnes ......... 33/503 |
| 3,509,635 | A |   | 5/1970  | Meinke              |
| 3,531,868 | A | * | 10/1970 | Stevenson ..... 33/503 |
| 3,678,584 | A | * | 7/1972  | Dolan ............ 33/559 |
| 4,288,925 | A |   | 9/1981  | McMurtry            |
| 4,523,382 | A |   | 6/1985  | Werner et al.       |
| 4,807,152 | A | * | 2/1989  | Lane et al. ..... 700/247 |
| 5,189,806 | A |   | 3/1993  | McMurtry            |

(Continued)

FOREIGN PATENT DOCUMENTS
EP 0 093 299 11/1983
(Continued)

OTHER PUBLICATIONS
International Search Report Aug. 9, 2007.

*Primary Examiner* — Amy Cohen Johnson
(74) *Attorney, Agent, or Firm* — RatnerPrestia

(57) ABSTRACT

An attitude arm mounted to a support arm is rotatable about a pivot. The attitude arm holds a stylus gauge, which generates a signal representing deflection of the stylus in a measurement direction as the stylus follows a surface of a workpiece rotated on a turntable. An attitude switching mechanism allows switching between a first stylus attitude generally aligned with the turntable spindle axis and a second stylus attitude generally aligned perpendicular to the turntable spindle axis. To enable alignment of the measurement direction with the spindle axis, first and second adjusters enable the stylus tip to be moved perpendicular to the spindle axis and the measurement direction when in the first and second stylus attitudes, respectively. An orientation mechanism is provided to rotate the measurement direction of the stylus. A stylus tilt mechanism is provided to tilt the stylus about a tilt axis parallel with the measurement direction.

20 Claims, 11 Drawing Sheets

U.S. PATENT DOCUMENTS

| | | | |
|---|---|---|---|
| 7,036,238 B2 * | 5/2006 | Kojima et al. | 33/503 |
| 7,140,119 B2 * | 11/2006 | Badami et al. | 33/507 |
| 7,197,835 B2 * | 4/2007 | Takanashi | 33/503 |
| 2005/0132591 A1 | 6/2005 | Kojima | |

FOREIGN PATENT DOCUMENTS

| | | |
|---|---|---|
| EP | 0 240 151 A2 | 10/1987 |
| EP | 0 335 474 A1 | 10/1989 |
| WO | WO 90/07097 | 6/1990 |

* cited by examiner

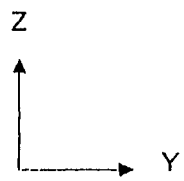 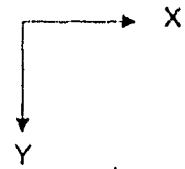
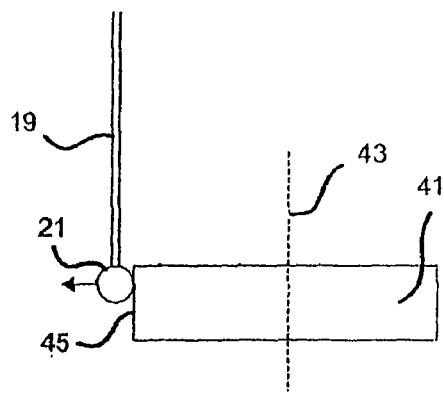 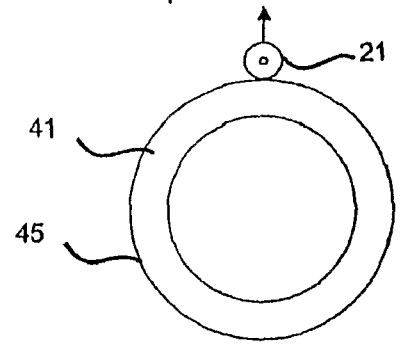
FIG. 3A    FIG. 3B
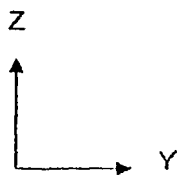 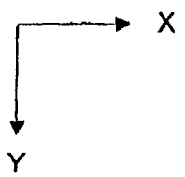
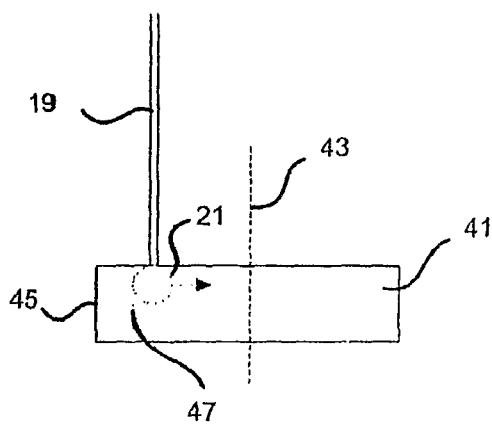 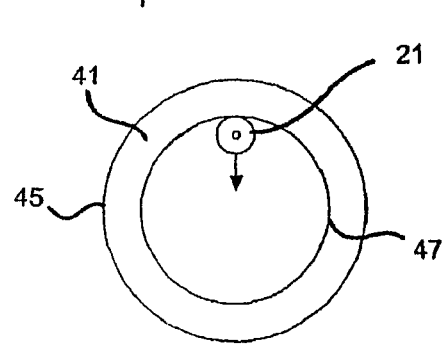
FIG. 4A    FIG. 4B

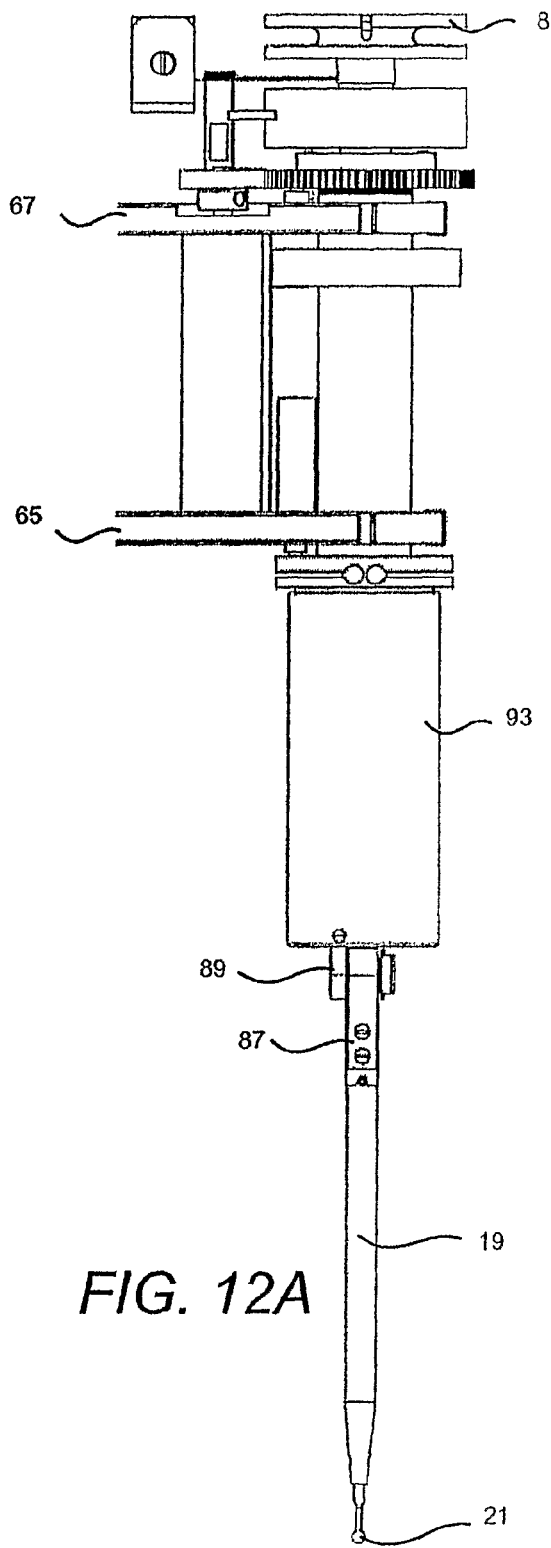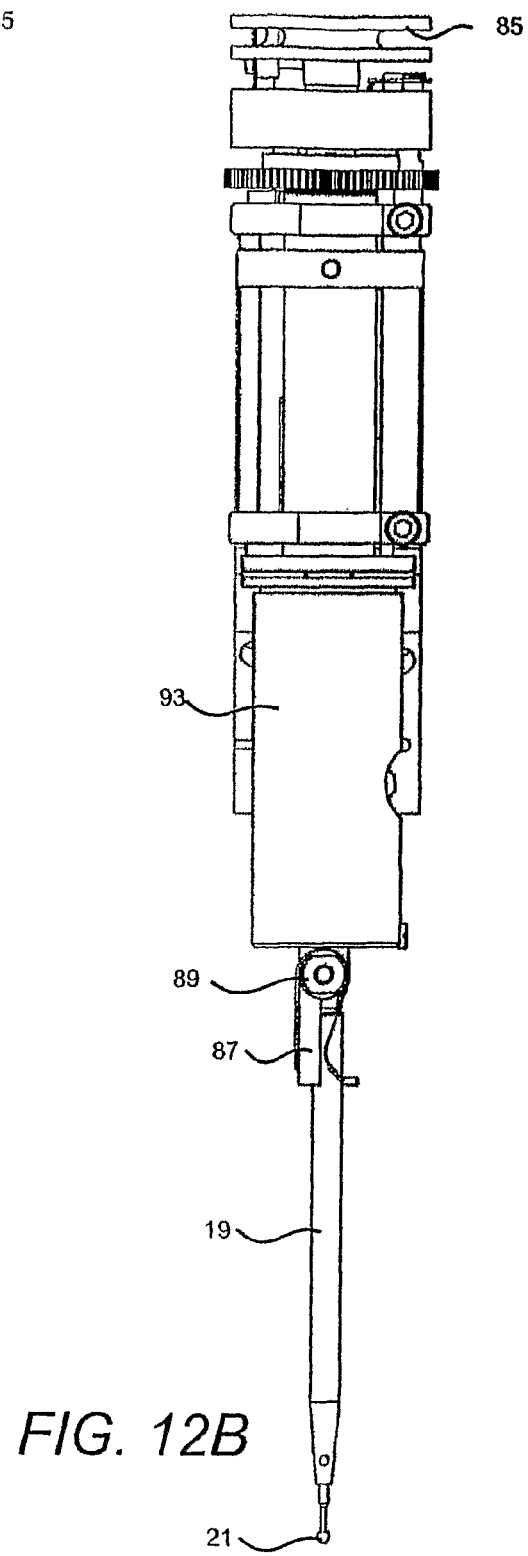
FIG. 12A
FIG. 12B

METROLOGICAL APPARATUS FOR MEASURING SURFACE CHARACTERISTICS

FIELD OF THE INVENTION

The present invention is concerned with a metrological instrument for measuring surface characteristics.

BACKGROUND

For many manufactured products and components it is important that surface characteristics such as form and shape are within defined tolerances. Metrological instruments are known which measure such surface characteristics for quality control purposes. These metrological instruments must be manufactured to a high precision in order to minimise the effect of systematic errors introduced by the metrological instrument on measurement readings.

EP-A-0240151 discusses a metrological instrument which measures the form of a workpiece mounted on a turntable. In particular, a stylus gauge is supported relative to the turntable and generates a signal representative of the deflection of the elongate stylus along a measurement direction as the stylus follows a surface of the workpiece on rotation of the turntable about a spindle axis. The stylus gauge is mounted on an attitude arm which is rotatable about a pivot axis so that the stylus can be switched between a substantially vertical configuration and a substantially horizontal configuration while generally maintaining the stylus tip in the same position. The stylus gauge also includes a stylus orientation mechanism for rotating the measurement direction.

A problem with Instruments such as that discussed in EP-A-0240151 is that imperfections in the manufacture of the stylus gauge and the stylus can lead to a loss of the correct alignment of the measurement direction at the stylus tip and the spindle axis. Previously, manual adjustments have been provided for correcting any such misalignment. However, these manual adjustments must be performed each time the attitude of the stylus or orientation of the measurement direction is changed to achieve optimal accuracy.

SUMMARY OF THE INVENTION

According to a first aspect of the invention, there is provided a metrological instrument including a turntable for supporting a workpiece and a support for supporting a stylus gauge. The support includes a support body and an attitude arm which is mounted to the support body so as to be rotatable about a pivot axis. The attitude arm holds the stylus gauge which generates a signal representative of the deflection of the stylus as the stylus follows a surface of the workpiece on rotation of the turntable about the spindle axis. An attitude switching mechanism allows rotation of the attitude arm about the pivot axis to switch the attitude of the stylus between a first attitude in which the stylus is generally aligned with the spindle axis and a second attitude in which the stylus is generally aligned perpendicular with the spindle axis. The attitude arm includes a first adjuster for moving the stylus tip in a direction perpendicular to both the spindle axis and the measurement direction when the stylus is in the first attitude to allow alignment of the measurement direction with the spindle axis, and a second adjuster for moving the stylus tip in a direction perpendicular to both the spindle axis and the measurement direction when the stylus is in the second attitude to allow alignment of the measurement direction and the spindle axis. In this way, if the stylus tip is correctly aligned using the first adjuster when in the first attitude and then the attitude of the stylus is switched to the second attitude, when the second adjuster is used to align the stylus tip correctly in the second attitude the alignment for the first attitude will be unaffected. Therefore, when the stylus is switched back to the first attitude it is still correctly aligned.

According to a second aspect of the invention, there is provided a metrological instrument having a turntable for supporting a workpiece and a support supporting a stylus gauge. The stylus gauge generates a signal representative of the deflection of the stylus along a measurement direction as the stylus follows a surface of a workpiece on rotation of the turntable about a spindle axis. An orientation mechanism is provided which rotates the measurement direction of the stylus. A stylus tilt mechanism allows the stylus to be tilted about a tilt axis which is parallel with the measurement direction. In this way, the stylus can be tilted to position the stylus tip such that when the measurement direction of the stylus is correctly aligned with the measurement direction, on rotation of the measurement direction through 180° the correct alignment is maintained.

BRIEF DESCRIPTION OF THE DRAWINGS

An embodiment of the present invention will now be described with reference to the accompanying drawings, in which:

FIGS. 3A and 3B respectively show side and plan views of the stylus in a first positional configuration with respect to a workpiece;

FIGS. 4A and 4B respectively show side and plan views of the stylus in a second positional configuration with respect to a workpiece;

FIGS. 12A and 12B show different side views of the stylus gauge mounted in the mounting mechanism;

DETAILED DESCRIPTION

Figure 1:
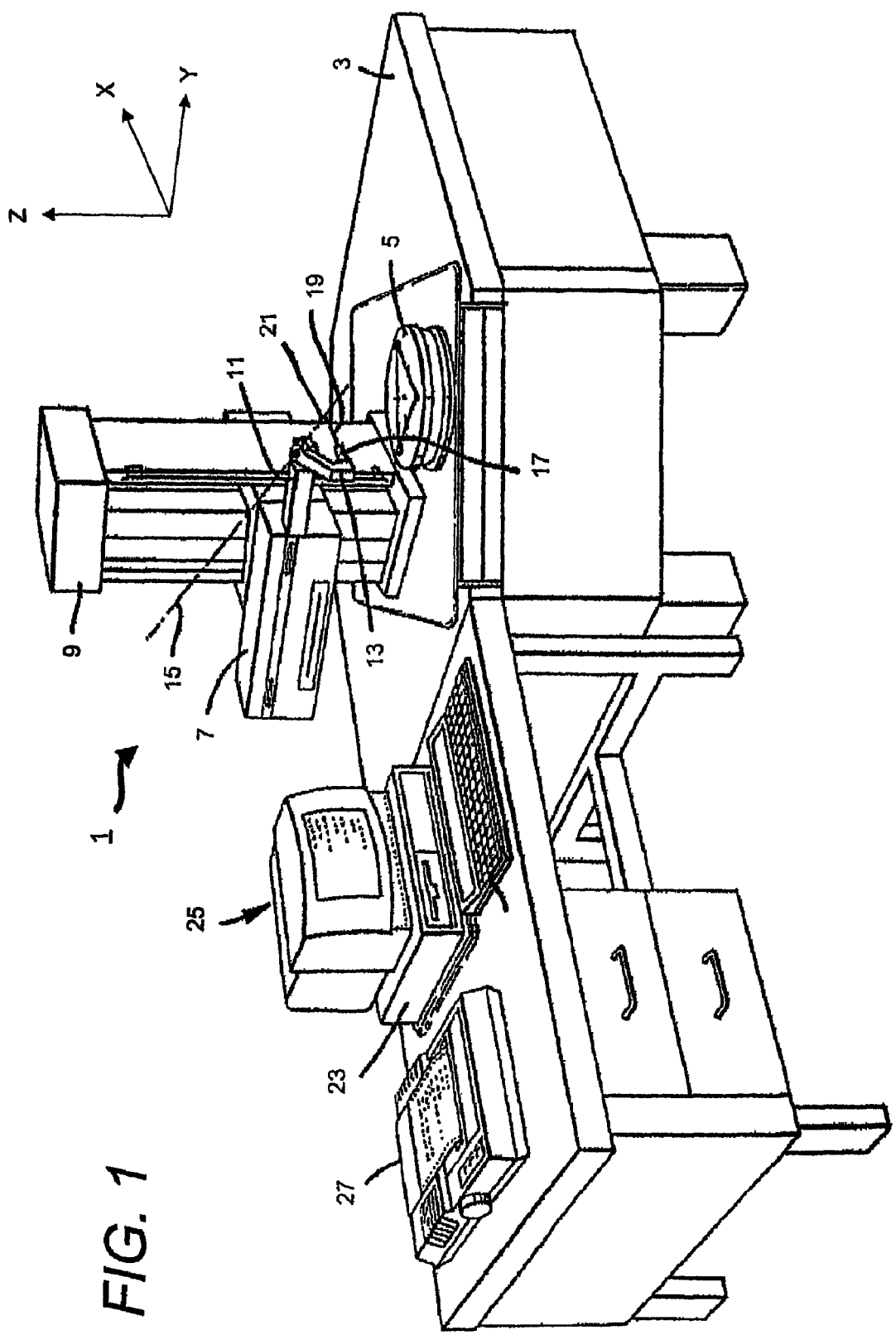
FIG. 1 shows a perspective view of a metrological instrument according to an embodiment of the present invention.

FIG. 1 shows a metrological instrument 1 which is supported by a bench 3. The metrological instrument 1 has a turntable 5 for supporting the workpiece being measured (not shown in FIG. 1). A carriage 7 is supported for vertical movement (which corresponds to the z-direction of the Cartesian co-ordinate system illustrated in FIG. 1) on a column 9 and carries an arm 11 which is movable horizontally along the y-direction of the Cartesian co-ordinate system.

One end of an attitude arm 13 is pivotally mounted to one end of the horizontally movable arm 11 for pivotal movement about an axis 15 which is at 45° to the horizontal (hereinafter referred to as the knuckle axis 15). A stylus gauge 17 is mounted to the other end of the attitude arm 13. In this embodiment, the stylus gauge has a stylus 19, with a stylus tip 21 for abutting a surface of the workpiece being measured, and an inductive transducer (not shown in FIG. 1) for monitoring movement of the stylus tip 21.

In use, as the turntable 5 rotates the stylus tip 21 follows the surface of the workpiece. Any movement of the stylus tip 21 is converted by the transducer into an electrical signal which is processed by a remote processing unit 23 to determine at least one of a number of surface characteristics of the workpiece. The results may be displayed on a screen 25, or printed by a printer 27. The instrument 1 may be used to measure the surface characteristics of components. For example, for a rotationally symmetrical component the measurements which the metrological instrument 1 can perform include the roundness of exterior circumferential surfaces and interior circumferential surfaces and the straightness and surface roughness of horizontally-facing surfaces.

The turntable 5 includes a centering motor (not shown) which allows transverse movement of the platform on which the workpiece rests relative to the spindle axis along a traverse direction to allow the workpiece to be centred about the spindle axis. In this embodiment, the metrological instrument is able to perform a conventional automated centering operation using the centering motor, and also a user control is provided for manually nudging the platform in a stepwise manner along the traverse direction.

In this embodiment, the stylus 19 is constrained to move to and from the rest position in only one nominally linear direction (hereinafter called the measurement direction) on one side of the rest position, and the transducer is arranged to measure deflections of the stylus 19 in the measurement direction. In order to allow the stylus tip 21 to access a variety of measurement surfaces and perform different types of measurement, an attitude switching mechanism is provided which allows the stylus to be moved between a generally vertical alignment and a generally horizontal alignment, and an orientation mechanism is provided which allows adjustment of the measurement direction.

Figure 2:
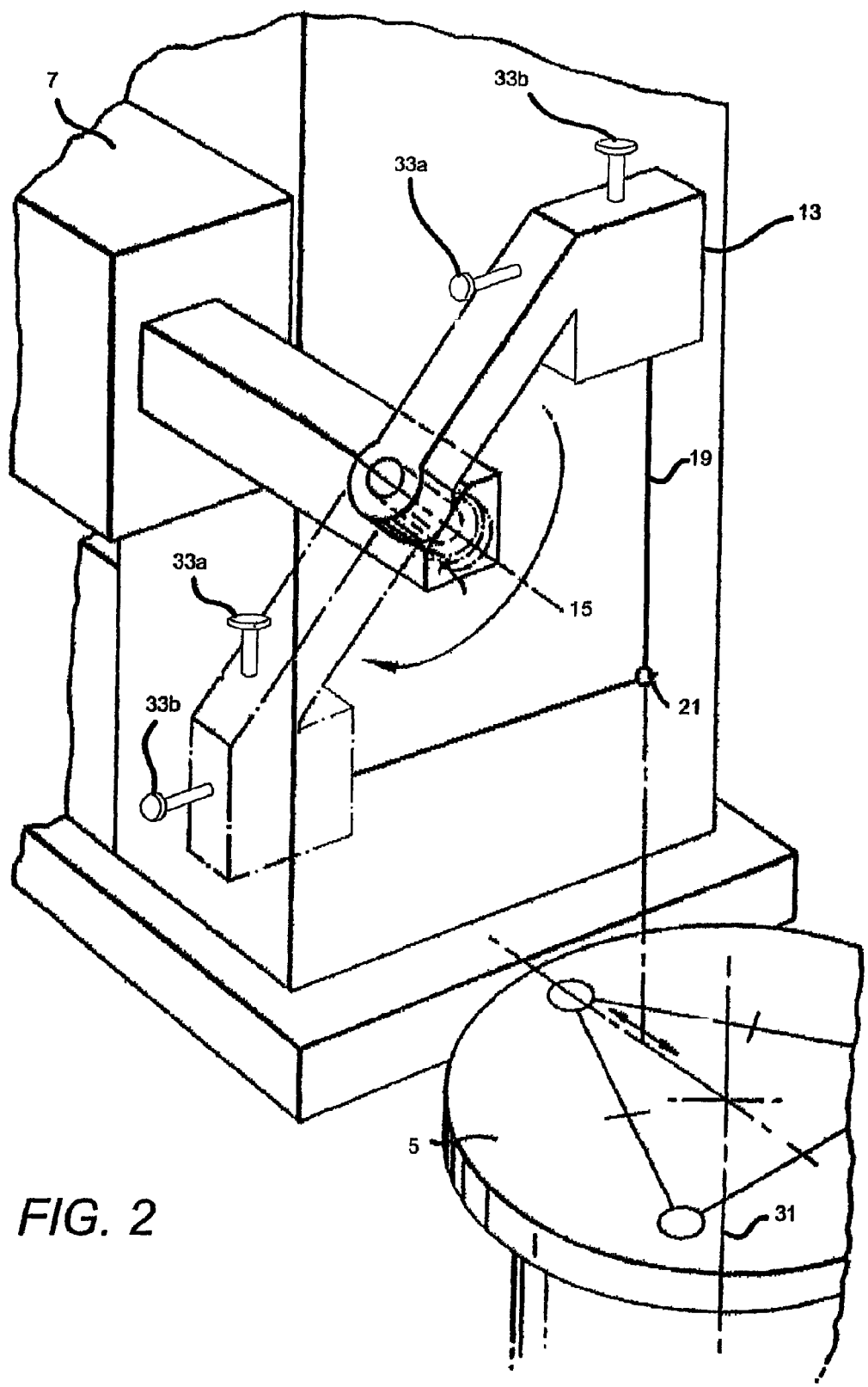
FIG. 2 shows a more detailed view of an attitude arm forming part of the metrological instrument illustrated in FIG. 1.

As shown in more detail in FIG. 2, the attitude switching mechanism allows the attitude arm 13 to be pivoted through 180° about the knuckle axis 15 between a first configuration (represented by the solid lines in FIG. 2 and hereinafter referred to as the "vertical attitude") in which the stylus 19 is generally aligned with the z-direction and a second configuration (represented by the phantom lines in FIG. 2 and hereinafter referred to as the "horizontal attitude") in which the stylus 19 is generally aligned with the x-direction.

In this embodiment, as will be described in more detail hereinafter, user actuators 33$a$, 33$b$ provided on the attitude arm 13 allow fine adjustment of the position of the stylus.

The orientation mechanism (not shown) allows rotation of the stylus gauge 17 about an axis which is generally aligned with the rest position of the stylus in order to rotate the measurement direction. In this embodiment, the orientation mechanism has a rotational range of 270°. The pivotable attitude arm 13 mounted on the 45° knuckle axis 15 allows the tip 21 of the stylus to remain in substantially the same location relative to the longitudinal axis 31 of the turntable 5 (hereinafter referred to as the spindle axis 31) while rotating 90° from vertical to horizontal or vice versa In this embodiment, the stylus 19 can be arranged in five different predefined positional configurations, for two of which the attitude arm 13 is in the vertical attitude and for three of which the attitude arm 13 is in the horizontal attitude.

FIGS. 3A and 3B respectively show side and plan views of the stylus 19 in a first positional configuration abutting a hollow cylindrical workpiece 41 whose longitudinal axis 43 is aligned with the z-direction.

As shown, in the first positional configuration the stylus 19 is generally aligned with the z-direction and the measurement direction is in the y-direction from the rest position towards the column 9 and back to the rest position. The first positional configuration is typically used to measure vertically aligned surfaces such as the exterior circumferential surface 45 of the hollow cylindrical workpiece 41.

FIGS. 4A and 4B respectively show side and plan views of the stylus 19 in a second positional configuration abutting a hollow cylindrical workpiece 41 whose longitudinal axis is aligned with the z-direction. As shown, in the second positional configuration the stylus 19 is generally aligned with the z-direction and the measurement direction is in the y-direction from the rest position away from the column 9 and back to the rest position (i.e. a direction diametrically opposed to the measurement direction for the first positional configuration). To move from the first positional configuration to the second positional configuration, the stylus gauge is rotated by the orientation mechanism through 180°. The second positional configuration is typically used to measure vertically aligned surfaces such as the interior circumferential surface 47 of the hollow cylindrical workpiece 41.

Figure 5A:
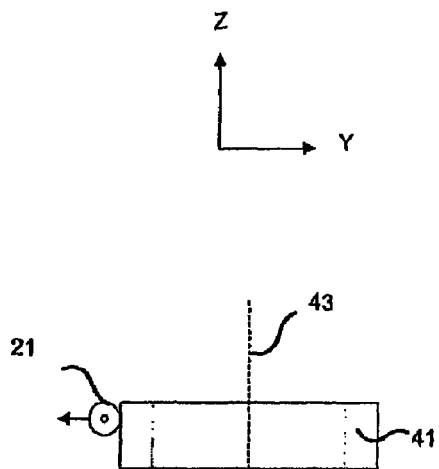
FIGS. 5A and 5B respectively show side and plan views of the stylus in a third positional configuration with respect to a workpiece.
Figure 5B:
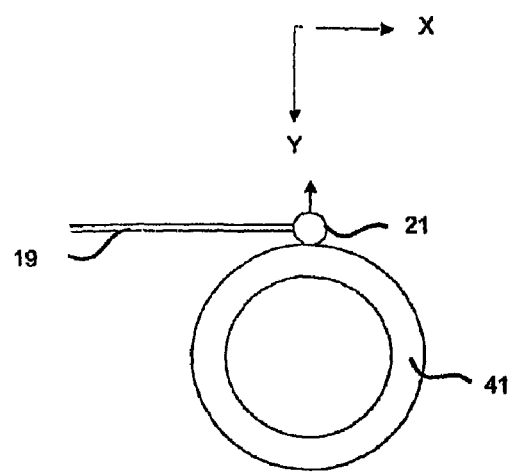

FIGS. 5A and 5B respectively show side and plan views of the stylus 19 in a third positional configuration abutting a hollow cylindrical workpiece 41 whose cylindrical axis is aligned with the z-direction. As shown, in the third positional configuration the stylus 19 is generally aligned with the x-direction and the measurement direction is in the y-direction from the rest position towards the column 9 and back again. This can be achieved starting from the first positional configuration by changing the attitude of the attitude arm 13 from the vertical attitude to the horizontal attitude. The third positional configuration is typically used to measure vertically aligned surfaces such as the exterior circumferential surface 45 of the hollow cylindrical workpiece 41, and is particularly useful when flange portions prevent the use of the first stylus positional configuration described above.

Figure 6A:
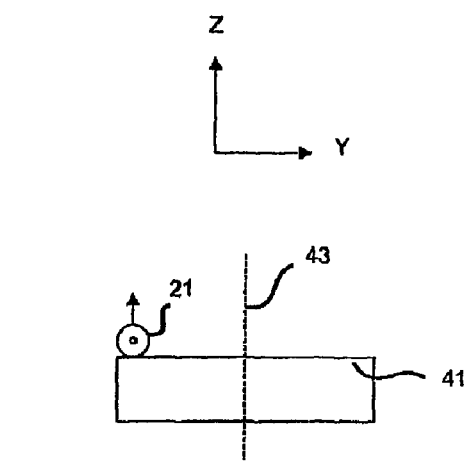
FIGS. 6A and 6B respectively show side and plan views of the stylus in a fourth positional configuration with respect to a workpiece.
Figure 6B:
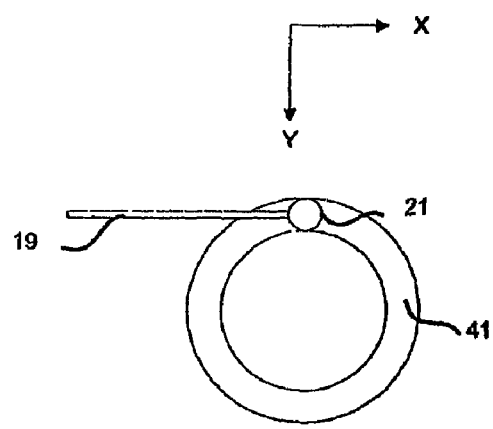

FIGS. 6A and 6B respectively show side and plan views of the stylus in a fourth positional configuration abutting a hollow cylindrical workpiece 41 whose cylindrical lo axis is aligned with the z-direction. As shown, in the fourth positional configuration the stylus 19 is generally aligned with the x-direction and the measurement direction is in the z-direction from the rest position in an upwards direction and back again. To achieve this, the stylus gauge 17 is rotated by the orientation mechanism through 90° from the third positional configuration. The fourth positional configuration is typically used to measure horizontally aligned upwardly-facing surfaces.

Figure 7A:
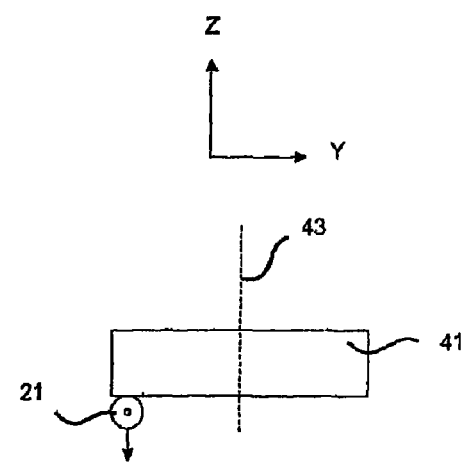
FIGS. 7A and 7B respectively show side and plan views of the stylus in a fifth positional configuration with respect to a workpiece.
Figure 7B:
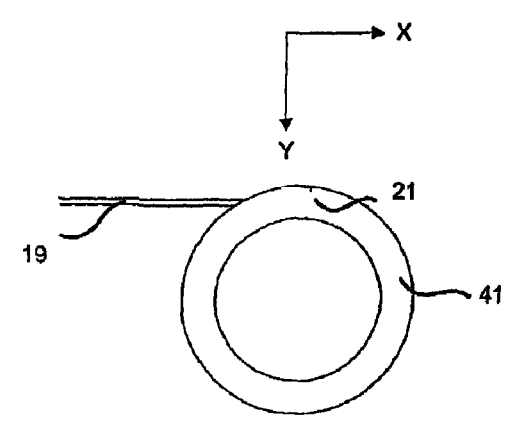

FIGS. 7A and 7B respectively show side and plan views of the stylus in a fifth positional configuration abutting a hollow cylindrical workplace 41 whose cylindrical axis 43 is aligned with the z-direction. As shown, in the fifth positional configuration the stylus 19 is generally aligned with the x-direction and the measurement direction is in the z-direction from the rest position in a downwards direction and back again. To achieve this, the stylus gauge is rotated by the orientation mechanism through 180° from the fourth positional configuration. The fifth positional configuration is typically used to measure horizontally aligned downwardly-facing surfaces.

Before performing a measurement, the workpiece 41 is centred and leveled on the turntable 5 so that the cylindrical axis 43 of the workpiece 41 is aligned with the spindle axis 31 of the turntable 5. The spindle axis 31 is aligned parallel with the z-direction during manufacture of the metrological instrument 1. In order to achieve accurate and repeatable measurement of the roundness of a cylindrical workpiece 41 the measurement direction of the stylus 19 must be aligned to intersect the spindle axis 31.

Figure 8:
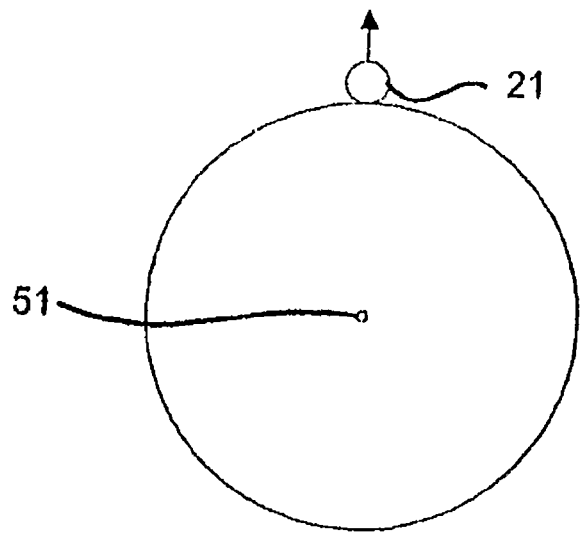
FIG. 8 shows a plan view of a stylus tip which is correctly aligned relative to a workpiece centred on a turntable forming part of the metrological instrument.
Figure 9:
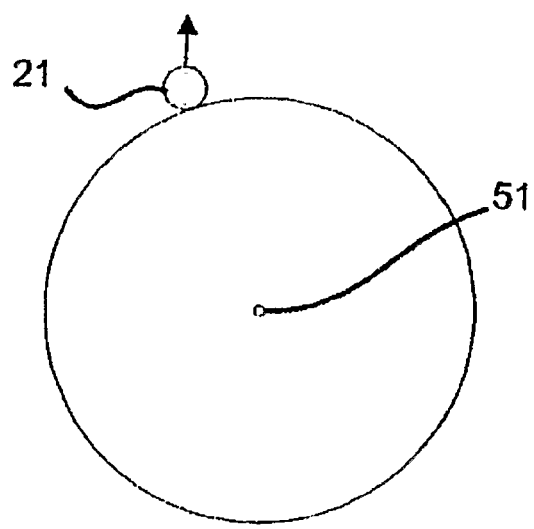
FIG. 9 shows a plan view of a stylus tip which is incorrectly aligned relative to a workplace centred on the turntable forming part of the metrological instrument.

FIG. 8 is a plan view showing a stylus tip 21 which is correctly aligned so that the measurement direction intersects the spindle axis 31. In such a correct alignment, the stylus 19 is conventionally referred to as being crested. FIG. 9 is a plan view showing a stylus tip 21 which is not correctly aligned. In particular, the measurement direction does not intersect the spindle axis 31. In such an alignment, the stylus 19 is conventionally referred to as having a cresting error.

If the metrological instrument 1 has a cresting error, then it will give an incorrect measurement reading. This is best exemplified by considering a measurement to check the shape of a conical workpiece by taking a series of roundness measurements at different longitudinal positions in the z-direction. If the stylus 19 is correctly crested, a true cone results in a series of circular traces for longitudinal positions extending from the base to the apex of the conical workpiece. However, if the stylus is incorrectly crested, a true cone results in a series of off-circular traces up to a longitudinal position below the apex of the conical workpiece at which the stylus tip 21 loses contact with the conical workpiece.

In this embodiment, the metrological instrument 1 has mechanisms which allow cresting errors resulting from the stylus 19 being switched between the five different positional configurations to be reduced. In particular, the metrological instrument 1 has:

1. a stylus tilt mechanism which ensures that if the stylus is correctly crested in the first positional configuration described above, then when the orientation mechanism rotates the stylus gauge through 180° into the second configuration described above the stylus will also be correctly crested; and 2. a stylus displacement mechanism which enables cresting alignment to be independently carried out for the first positional configuration (in which the attitude arm 13 is in the vertical attitude) and the third positional configuration (in which the attitude arm 13 is in the horizontal attitude) described above so that if the stylus 19 is initially correctly crested in the first positional configuration and then the stylus 19 is switched to the third positional configuration, then the stylus 19 can be correctly crested in the third positional configuration without losing the cresting alignment for the first positional configuration.

As will be discussed in more detail hereafter, the stylus displacement mechanism utilises the two user actuators 33a, 33b which, when adjusted by a user, move the stylus 19 in perpendicular directions.

The components mounted on the attitude arm 13 will now be described in more detail with reference to FIGS. 10 to 17.

Figure 10:
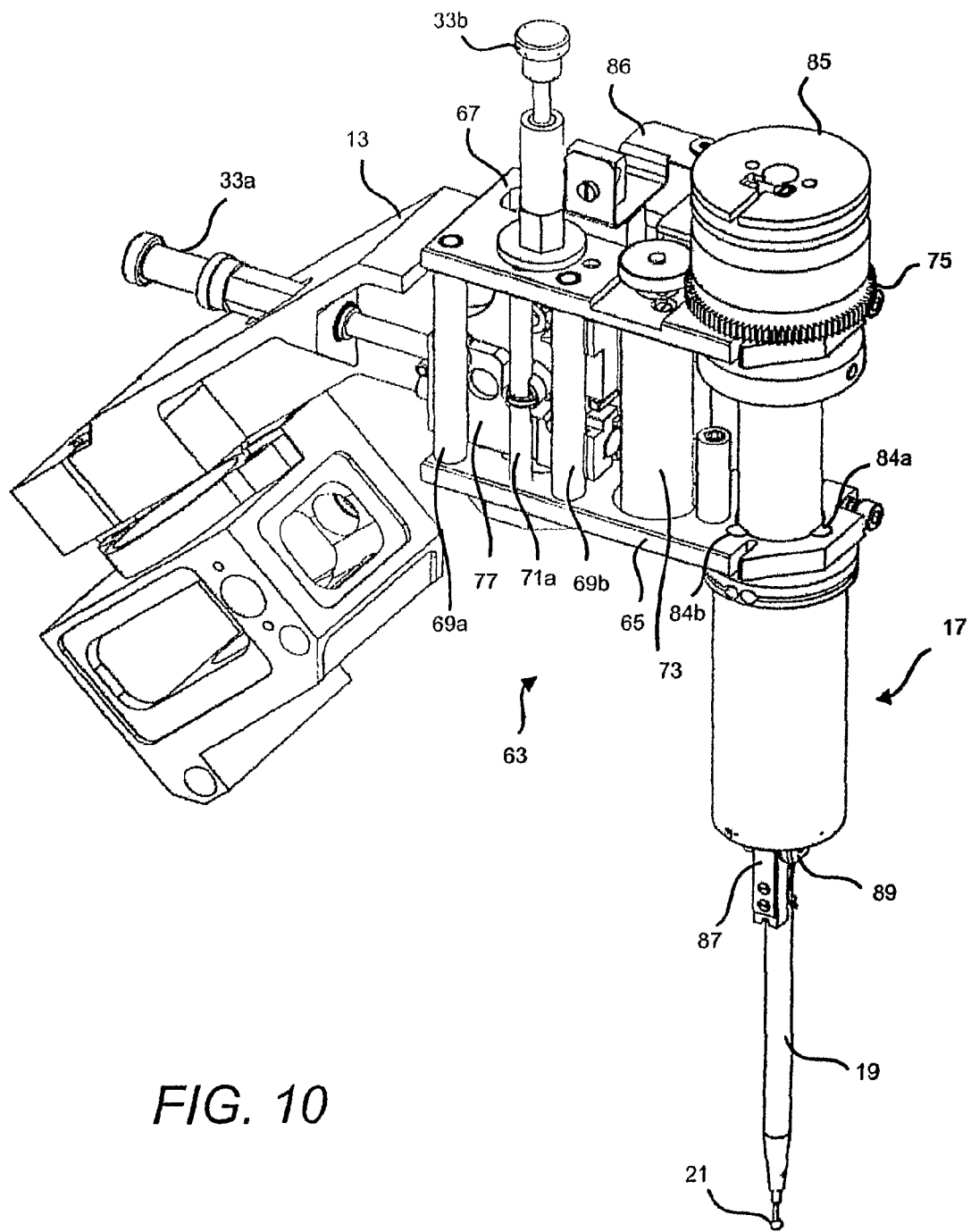
FIGS. 10 and 11 respectively show different perspective views of the attitude arm, the orientation mechanism, a stylus gauge and a mounting mechanism mounting the stylus gauge to the attitude arm
Figure 11:
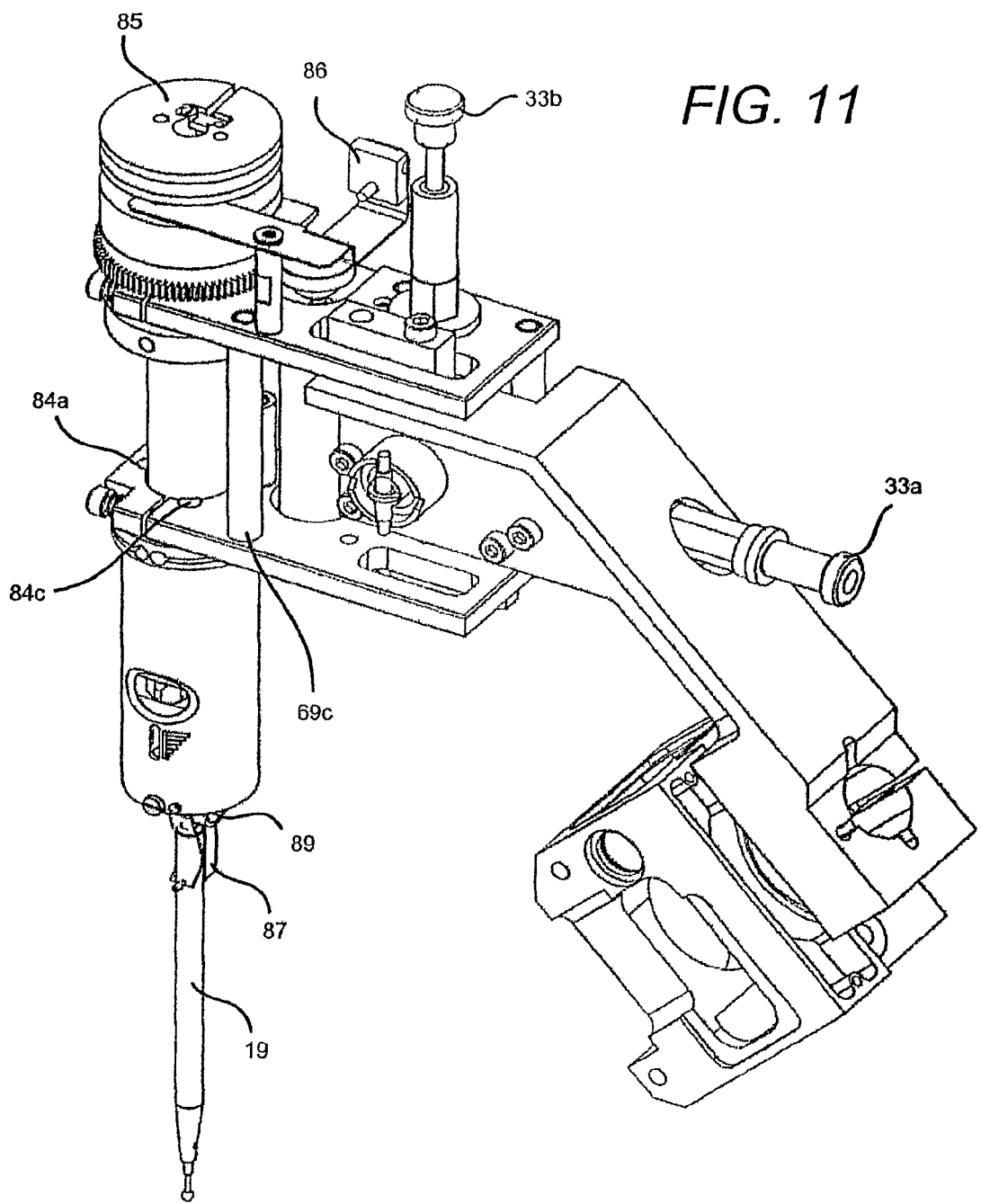

FIGS. 10 and 11 respectively show from two different perspectives the attitude arm 13, the stylus gauge 17 and a mounting mechanism 63 for mounting the stylus gauge 17 to the attitude arm 13. In FIGS. 10 and 11 protective covers which in use enclose the mounting mechanism 63 and part of the stylus gauge 17 (as shown in FIG. 2) have been removed to reveal components of the stylus gauge 17 and the mounting mechanism 63.

As shown in FIGS. 10 and 11, the main body of the stylus gauge 17, is elongated and defines an axis, hereafter called the stylus axis. The stylus gauge 17 is mounted to a cage formed by two parallel plates 65, 67 interconnected by three cylinders 69a, 69b and 69c, including a first cylinder 69a and a second cylinder 69b which, as will be described in more detail hereafter, act as runners. The cylinders 69 are aligned parallel with the stylus axis, so that the plates 65, 67 are perpendicular to the stylus axis. Each plate is generally rectangular with the lengthwise direction aligned to a longitudinal plate axis and the widthwise direction aligned to a transverse plate axis. Thus, the stylus axis, the longitudinal plate axis and the transverse plate axis form a three-dimensional orthogonal co-ordinate system.

A motor 73 is mounted between the parallel plates 65, 67 of the cage and engages a gear mechanism 75 forming part of the stylus gauge 17 such that when the motor 73 is activated the stylus gauge 17 is rotated about the stylus axis, thereby rotating to a transverse plate axis. Thus, the stylus axis, the longitudinal plate axis and the transverse plate axis form a three-dimensional orthogonal co-ordinate system.

A motor 73 is mounted between the parallel plates 65, 67 of the cage and engages a gear mechanism 75 forming part of the stylus gauge 17 such that when the motor 73 is activated the stylus gauge 17 is rotated about the stylus axis, thereby rotating the measurement direction. Accordingly, the motor 73 forms part of the orientation mechanism which is used to adjust the orientation of the stylus 19.

The stylus gauge 17 is rotatably mounted to each parallel plate 65, 67 via a series of three radial pads per plate (two radial pads being referenced 84a and 84b in FIG. 10) located at one longitudinal end of the parallel plate 65, 67. Each series of radial pads 84 act as a bearing with a pad in each plate being sprung loaded using a ligament which is integral with each plate so that stylus gauge 17 can be smoothly and accurately rotated when the motor 73 is actuated.

The inductive transducer is located within the body of the stylus gauge 17, and is connected to the remainder of the metrological instrument I by an electrical cable (not shown). A spool 85, located at the end of the stylus gauge 17 away from the stylus tip 21, takes up any slack in the electrical cable caused by rotation of the stylus gauge 17 by the motor 73. In addition, a cable guide 86 is mounted to the mounting mechanism 63 to guide the cable away from the stylus gauge 17.

The stylus 19 is detachably mounted to a stylus holder 87 which is in turn connected to the main body of the stylus gauge 17 via a crutch mechanism 89. The stylus holder 87 can accommodate a variety of interchangeable styli which may have differently shaped stylus tips. The choice of stylus tip is dependent upon the measurement application, for example a ball shaped stylus tip is appropriate for measuring surface roundness whereas a stylus tip with a conispherical profile (a cone with a sphere attached at its apex) is suitable for measuring surface texture. The crutch mounting 89 enables the stylus 19 to be tilted away from the stylus axis about an axis perpendicular to the measurement direction. This is useful for situations where otherwise the shape of the object would prevent the stylus from making contact with a measurement surface, e.g. inverted cones or cam shafts. While the crutch mounting 89 allows movement of the stylus 19 away from being aligned either parallel with or perpendicular to the spindle axis of the turntable, it will be appreciated that in each attitude of the attitude arm 13 the stylus 19 can still be stated to be either generally aligned parallel with the spindle axis or generally aligned perpendicular with the spindle axis.

Ideally, the measurement direction (which is associated with the stylus tip 21) should intersect the stylus axis (which is defined by the main body of the stylus gauge 17) so that if the measurement direction intersects the spindle axis 31 then on rotation of the stylus through 180° about the stylus axis the measurement direction will still intersect the spindle axis 31. However, due to manufacturing variations in the stylus 19 and the stylus gauge 17, this will not necessarily be the case. The stylus tilt mechanism mentioned above provides adjustment of the stylus tip position in order to address this problem.

Figures 13, 14:
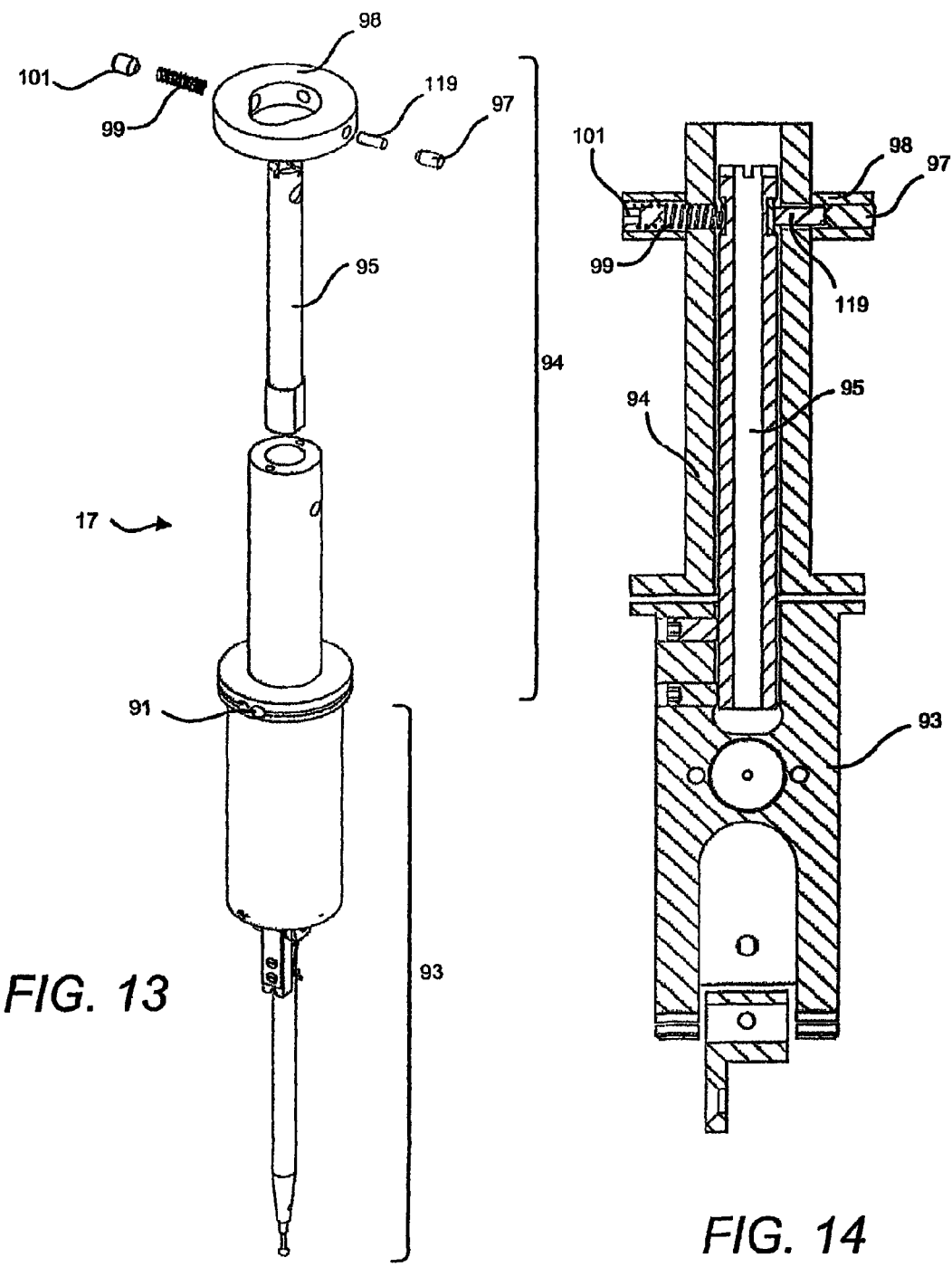
FIG. 13 shows an exploded view of the stylus gauge.
FIG. 14 shows a cross section through the stylus gauge.

FIG. 13 shows an exploded view of the stylus tilt mechanism and FIG. 14 shows a cutaway section of the stylus tilt mechanism. As shown in FIGS. 13 and 14, the stylus gauge 17 has two diametrically opposed flexion points 91 separating the stylus gauge into a stylus part 93 and a mounting part 94. The flexion points 91 allow the stylus part 93 to tilt relative to the mounting part 94 about a flexion axis which is parallel with the measurement direction, thereby allowing the stylus tip 21 to be positioned so that the measurement direction passes through the stylus axis The amount of tilt at the flexion points is controllable through a user adjustable screw 97 which fits in a threaded hole through a collar 98 which is fixed to the mounting part 94. The tip of the user adjustable screw 97 abuts a slug 119 which in turn abuts one side of an end portion of a control lever 95 which passes through the stylus gauge 17. A sprung mounting 99, 101 is provided on the opposite side of the control lever 95 to the slug 119 so as to urge the control lever 95 into contact with the slug 119.

The control lever 95 passes through the mounting part 94, past the flexion points 91, and into the stylus part 93, where the other end portion of the control lever 95 is fixed to the stylus tip part 93. In this way, as the user adjustable screw 97 is turned by an operator the stylus part 93 pivots about the flexion points 91, thereby tilting the stylus part 93 relative to the mounting part 94. In this embodiment, the distance along the stylus axis between the user adjustable screw 97 and the flexion points 91 is one third of the distance between the stylus tip 21 and the flexion points 91. Therefore deflection of the control lever 95 by 1 mm at the level of the user adjustable screw 97 causes a 3 mm deflection of the stylus tip 21 in the longitudinal plate axis direction.

Returning to FIGS. 10 and 11, the cage is coupled to the attitude arm 13 via a two-dimensional translation stage arrangement in which the cage is movable relative to a slideway 77 along an axis parallel with the stylus axis and the slideway 77 is movable relative to the attitude arm 13 along an axis parallel with the longitudinal plate axis.

Figure 15:
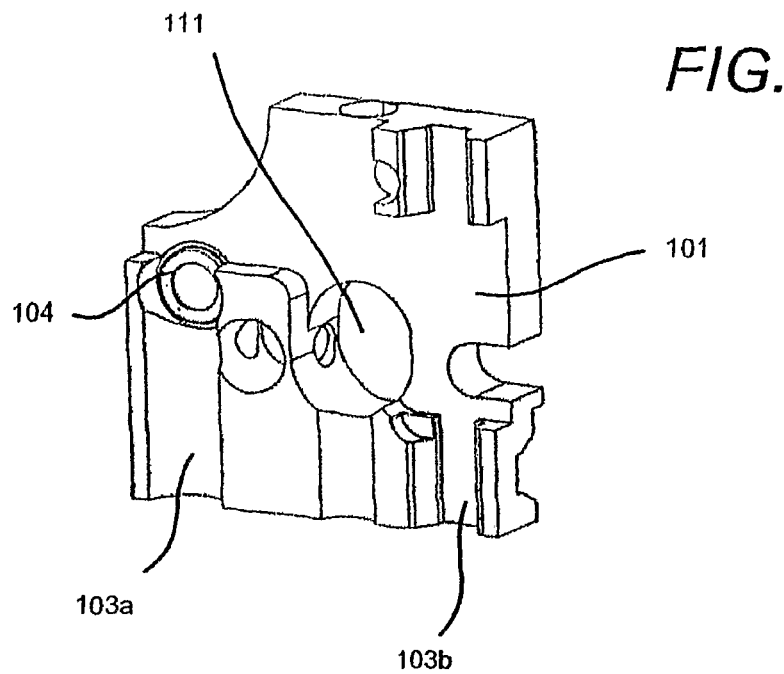
FIGS. 15 and 16 respectively show front and back perspective views of a slideway forming part of the mounting mechanism.
Figure 16:
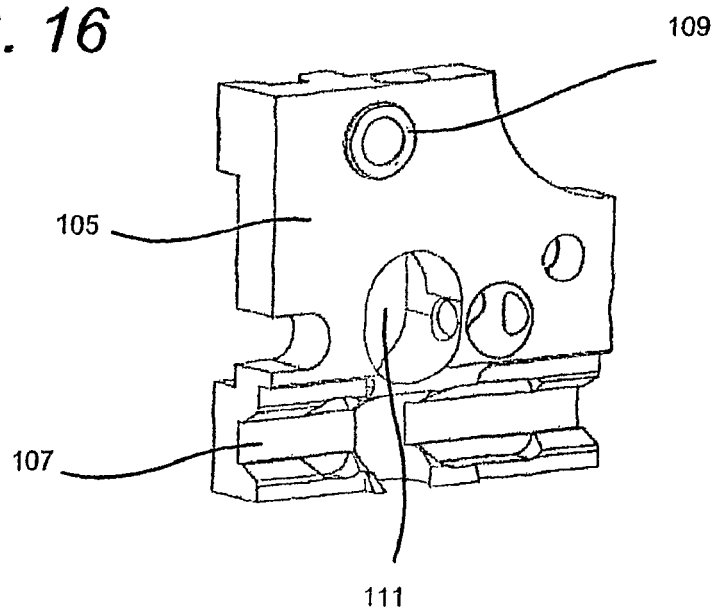

FIGS. 15 and 16 respectively show front and back perspective views of the slideway 77. As shown, an aperture 111 is provided through the centre of the slideway 77 from the front face 101 to the back face 105. The front face 101 of the slideway 77 has a single vee cross-section groove 103b and a clearance cut-out 103a which are separated by the aperture 111 and, when the slideway 77 is mounted, extend parallel with the stylus axis. A pad 104 is mounted in the clearance cut-out. The vee cross-section groove 103b and the pad 104 act as a kinematic mount. The back face 105 of the slideway 77 has a single vee cross-section groove 107 which, when the slideway 77 is mounted, extends parallel with the longitudinal plate axis. The back face 105 also has a pad 109 spaced away from the single groove 107 so that the groove 107 and the pad 109 define a kinematic mount.

Figure 17:
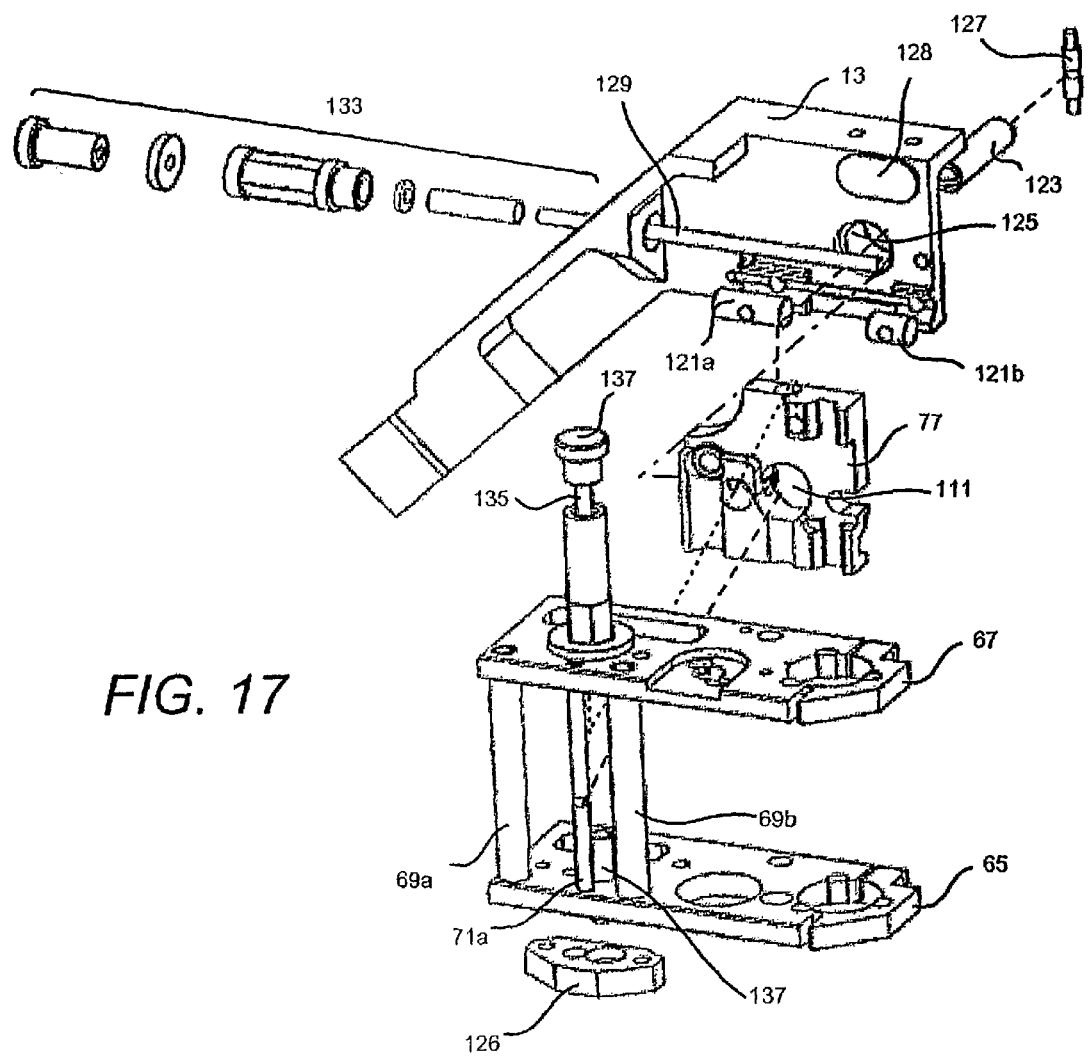
FIG. 17 is an exploded view of the attitude arm, the slideway and a cage forming part of the mounting mechanism.

FIG. 17 is an exploded view showing part of the attitude arm 13, the slideway 77 and part of the cage. As shown, the attitude arm 13 has a first section which extends at an angle of about 45° to the stylus axis from the knuckle pivot point. At the end of the first section away from the knuckle pivot point a second section of the attitude bar 13 extends perpendicular to the stylus axis so that the second section is at an angle of 45° to the first section. The second section includes a mounting surface facing the slideway 77. Cylindrical bar members 121a and 121b are attached onto the mounting surface, and an aperture 125 is formed through the mounting surface such that when the bar members 121 engage the groove 107 on the back face 105 of the slideway 77, the aperture 125 through the mounting surface is generally aligned with the aperture 111 through the slideway 77.

The two runners 69a, 69b respectively locate on the pad 104 in the clearance cut-out 103a and the vee cross-section groove 103b at the front face 101 of the slideway 77. A spring 123 passes through the aperture 125 in the mounting surface and the aperture 111 in the slideway 77. One end of the spring is attached to a spring retaining rod 71a which is mounted between the first plate 65 and the second plate 67. The other end of the spring engages a dowel 127 mounted to the surface opposing the mounting surface. In this way the cage, the slideway 77 and the attitude arm 13 are urged into contact with each other.

When the bar members 121 are urged into engagement with the groove 107 in the back face 105 of the slideway 77, the pad 109 on the back face 105 of the slideway 77 rests on a pad 128 attached to the mounting surface such that the mounting surface and the slideway 77 are substantially parallel. In this way, the slideway 77 is movable relative to the mounting surface along a direction parallel with the longitudinal plate axis. When the first cylinder 69a and the second cylinder 69b are respectively urged into engagement with the pad 104 and the vee cross-section groove 103b of the front face 101 of the slideway 77, the slideway 77 is movable relative to the cage in a direction parallel with the stylus axis.

One of the user actuators, hereafter called the first user actuator 33a, controls the movement of the slideway 77 relative to the attitude arm 13. The first user actuator 33a includes a shaft 129 which, as shown in FIG. 17, is aligned parallel with the longitudinal plate axis and passes through an aperture in the first section of the attitude arm 13 adjacent the slideway 77. One end of the shaft is fixed to the slideway 77, while the other end of the shaft is threaded and engages a user actuator knob 133 which includes a screwhead and is rotatably mounted at a fixed position relative to the attitude arm 13. In this way, when a user rotates the user actuator knob 133 the threaded end of the shaft 129 interacts with the screwhead to cause the shaft 129 to move along a direction parallel with the longitudinal plate axis, thereby moving the slideway 77 relative to the attitude arm 13 in the same direction.

The other of the user actuators, hereafter called the second user actuator 33b, controls the movement of the slideway 77 relative to the cage. The second user actuator 33b includes a shaft 135 which is aligned parallel with the stylus axis and, as shown in FIG. 17, passes through the plate 67. One end of the shaft 135 acts on the slideway 77, which is sprung-loaded by a biasing member 137 retained by a retaining member or a spring plate 126 to maintain the contact with the shaft 135, while the other end of the shaft is fixed to a user actuator knob 137. The shaft 135 is threaded through a hole in the plate 67 so that when a user rotates the user actuator knob 137 the shaft 135 moves along a direction parallel with the stylus axis, thereby moving the slideway 77 relative to the cage in the same direction.

The first user actuator 33a allows the user to move the stylus tip 21 to reduce any cresting error when the attitude arm 13 is in the vertical attitude. The second user actuator 33b allows the user to move the stylus tip 21 to reduce any cresting error when the attitude arm 13 is in the horizontal attitude. Importantly, due to the orthogonal directions of movement caused by the first and second actuators 33, adjustment using the first user actuator 33a will not affect the cresting error when the attitude arm is in the horizontal attitude and adjustment using the second user actuator 33b will not affect the cresting error when the attitude arm 13 is in the vertical attitude. Therefore, if the first user actuator 33a is used to remove cresting error when the attitude arm 13 is in the vertical attitude, then the attitude arm 13 is switched to the horizontal attitude and the second user actuator 33b is used to remove any cresting error, then when the attitude arm 13 is returned to the vertical attitude there will still be no cresting error.

A method of aligning the stylus tip will now be described. This method involves the use of a cylindrical calibration pin having a diameter of 1 mm.

Firstly, the calibration pin is manually positioned at the spindle axis 31 of the turntable 5. Then a conventional centring operation is performed with the stylus aligned vertically and abutting one side of the calibration pin to centre the calibration pin with the longitudinal axis of the calibration pin aligned with the spindle axis.

The first user actuator 33a is then manually adjusted while monitoring the reading from the inductive transducer as displayed on the screen 25 to find the turning point at which the reading from the transducer either changes from a rising signal to a falling signal, or changes from a falling signal to a rising signal. The position of the stylus at this turning point will be referred to as the external stylus position.

Next, the orientation mechanism is used to rotate the measurement direction for the stylus gauge through 180° and the stylus tip 21 is moved to abut the diametrically opposite side of the calibration pin. The position of the stylus at this orientation will be referred to as the internal stylus position. The turntable 5 is rotated so that the centering traverse of the turntable 5 is at 90° to the measurement direction of the stylus gauge 17. The centering traverse is then actuated to move the turntable incrementally to find the turning point of the gauge signal from the inductive transducer. A roundness measurement is then made and the measured eccentricity is a measure of the cresting error for this positional configuration.

The calibration pin is then re-centred. Next, the stylus tilt mechanism is used to shift the stylus tip 21 by a distance corresponding to approximately half the measured eccentricity. The orientation mechanism is then used to rotate the measurement direction back through 180°. Then, the first user actuator 33a is used to locate the stylus tip 21 at the turning point of the inductive transducer reading. The procedure outlined above is then re-iterated until the measured eccentricity is below a desired value (typically 100 µm (micrometers) for high precision parts).

The attitude switching mechanism is then used to switch the attitude arm 13 so that the stylus 19 is substantially horizontal. The second user actuator 33b is then manually adjusted while monitoring the reading from the inductive transducer as displayed on the screen 25 to find the turning point. The procedure detailed above for assessing the cresting error is repeated. If the cresting error is below the desired value, then the alignment is completed. Otherwise the above alignment process is iterated until the eccentricity is below the desired value.

MODIFICATIONS AND FURTHER EMBODIMENTS

As discussed above, the metrological instrument in the illustrated embodiment has both a stylus tilt mechanism and a stylus displacement mechanism. In alternative embodiments, the metrological instrument could include just one of these two mechanisms.

In the illustrated embodiment, the metrological instrument has an attitude arm which is rotatable about a pivot point to switch the stylus between attitudes in which the stylus is respectively generally parallel with and generally perpendicular to the spindle axis of the turntable. It will be appreciated that the stylus tilt mechanism is also advantageous in embodiments in which there is no such attitude arm and the attitude of the stylus is fixed, particularly where the stylus is generally aligned with the spindle axis. Further, in such an embodiment a stylus displacement mechanism having a single actuator could be used to allow for alignment to reduce cresting error.

While in the illustrated embodiment the stylus tilt mechanism tilts the stylus with respect to the body of the stylus gauge, in an alternative embodiment the entire stylus gauge could be tilted relative to the attitude arm.

In the illustrated embodiment, the attitude arm 13 is manually crested in both attitudes using respective user actuators 33. In an alternative embodiment, the alignment could be performed automatically under the control of the remote processor 23.

Although the attitude switching mechanism of the illustrated embodiment is automated, alternatively a manual attitude switching arrangement could be employed.

It will be appreciated that there are many different forms of two-dimensional 'x-y' translation stages which are well known in the art. Accordingly, alternative embodiments could utilise different 'x-y' translation stage arrangements.

In the illustrated embodiment, the carriage is vertically movable relative to the column and the arm is horizontally movable relative to the carriage in order to position the stylus tip in a desired position relative to the workplace. Alternatively, the turntable could be movable relative to the column to achieve the desired positioning.

While the described calibration method involves user participation, it will be appreciated that if the stylus displacement mechanism and the stylus tilt mechanism are automated, then the calibration method could also be automated.

The invention claimed is:

1. A metrological instrument comprising:
   a turntable for supporting a workpiece, wherein the turntable is rotatable about a spindle axis;
   a support supporting a stylus gauge for carrying an elongate stylus, the support comprising i) a support body and ii) an attitude arm which is mounted to the support body so as to be rotatable about a pivot axis, the attitude arm holding the stylus gauge, wherein the stylus gauge is arranged to generate a signal representative of the deflection of the elongate stylus along a measurement direction as the stylus follows a surface of the workpiece on rotation of the turntable about the spindle axis;
   an attitude switching mechanism for rotating the attitude arm about said pivot axis to switch the attitude of the stylus between a first attitude in which the longitudinal axis of the stylus is generally aligned with the spindle axis and a second attitude in which the longitudinal axis of the stylus is generally perpendicular to the spindle axis;
   wherein the attitude arm comprises i) a first adjuster for moving the stylus tip in a direction perpendicular to both the spindle axis and the measurement direction when the stylus is aligned with the spindle axis to allow alignment of the measurement direction with the spindle axis, and ii) a second adjuster for moving the stylus tip in a direction perpendicular to both the spindle axis and the measurement direction when the stylus is aligned perpendicular with the spindle axis to allow alignment of the measurement direction with the spindle axis.

2. A metrological instrument according to claim 1, wherein the first adjuster is coupled to the stylus gauge and is arranged to move the stylus gauge in a direction perpendicular to the both the spindle axis and the measurement direction when the stylus is in the first attitude.

3. A metrological instrument according to claim 1, wherein the second adjuster is coupled to the stylus gauge and is arranged to move the stylus gauge in a direction perpendicular to the both the spindle axis and the measurement direction when the stylus is in the second attitude.

4. A metrological instrument according to claim 1, further comprising a two way translation stage, the first and second adjusters being coupled to the two way translation stage in order to cause movement of the stylus tip in orthogonal directions.

5. A metrological instrument according to claim 1, wherein the first adjuster is manually adjustable to allow manual control of the movement of the stylus tip.

6. A metrological instrument according to claim 1, wherein the second adjuster is manually adjustable to allow manual control of the movement of the stylus tip.

7. A metrological instrument according to claim 1, wherein the pivot axis is at an angle of 45° from an axis parallel with the spindle axis.

8. A metrological instrument according to claim 1, further comprising an orientation mechanism to rotate said measurement direction of the stylus.

9. A metrological instrument according to claim 8, further comprising a stylus tilt mechanism to tilt the stylus about a tilt axis parallel with the measurement direction.

10. A metrological instrument according to claim 1, wherein the support further comprises an elongate column having a longitudinal axis substantially parallel with the spindle axis and a carriage mounted perpendicularly to the column, having a mounting arm to which the attitude arm is mounted at said pivot axis.

11. A metrological instrument comprising:
a turntable for supporting a workpiece, wherein the turntable is rotatable about a spindle axis;
a support to support a stylus gauge for carrying an elongate stylus with the longitudinal axis of the stylus generally aligned with the spindle axis, wherein the stylus gauge is arranged to generate a signal representative of the deflection of the elongate stylus along a measurement direction as the stylus follows a surface of the workpiece on rotation of the turntable about the spindle axis;
an orientation mechanism to rotate said measurement direction of the stylus; and
a stylus tilt mechanism to tilt the stylus about a tilt axis parallel with the measurement direction.

12. A metrological instrument according to claim 11, comprising an attitude arm wherein the stylus gauge includes a first part which is mounted to the attitude arm and a second part which is for carrying the stylus, and wherein the stylus tilt mechanism is arranged to tilt the second part of the stylus gauge relative to the first part of the stylus gauge about said tilt axis.

13. A metrological instrument according to claim 11, wherein the stylus tilt mechanism comprises a user adjuster allowing manual control of the tilting about the tilt axis.

14. A metrological instrument according to claim 13, wherein the stylus tilt mechanism comprises flexion points separating the stylus gauge into a stylus part and a mounting part, the flexion points allowing the stylus part to tilt relative to the mounting point about a flexion axis parallel to the measurement direction.

15. A metrological instrument according to claim 14, wherein the user adjuster comprises a user adjustable screw which abuts a slug which in turn abuts one side of an end portion of a control lever passing through the stylus gauge, the opposite side of the control lever being urged into contact with the slug, the control lever passing through the mounting part, past the flexion points, and into the stylus part where the other end portion of the control lever is fixed to a stylus tip part so that, as the user adjustable screw is turned by an operator, the stylus part pivots about the flexion points.

16. A metrological instrument according to claim 11, wherein the orientation mechanism is arranged to rotate the measurement direction of the stylus between a first position and a second position angularly spaced 180° from said first position.

17. A metrological instrument according to claim 16, wherein the stylus tilt mechanism is arranged to tilt the stylus so that the measurement direction of the stylus in the first position is aligned with the measurement direction of the stylus in said second position.

18. A metrological instrument according to claim 11, wherein the support further comprises an elongate column having a longitudinal axis substantially parallel with the spindle axis and a carriage mounted perpendicularly to the column, having a mounting arm to which the stylus gauge is mounted.

19. A metrological instrument according to claim 11, wherein the support comprises a pivotally mounted attitude arm and an attitude switching mechanism to allow the attitude arm to be pivoted through 180° about a knuckle axis between a first configuration in which the elongate stylus carried by the stylus gauge extends in a first direction and a second configuration in which the elongate stylus extends in a second direction perpendicular to the first direction.

20. A metrological instrument comprising:
a turntable for supporting a workpiece, wherein the turntable is rotatable about a spindle axis;
a support to support a stylus gauge for carrying an elongate stylus with the longitudinal axis of the stylus generally aligned with the spindle axis, wherein the stylus gauge is arranged to generate a signal representative of the deflection of the elongate stylus along a measurement direction as the stylus follows a surface of the workpiece on rotation of the turntable about the spindle axis;
an orientation mechanism to rotate said measurement direction of the stylus; and
a stylus tilt mechanism to tilt the stylus in a constrained manner about a tilt axis parallel with the measurement direction.

* * * * *